United States Patent [19]

Moschel

[11] Patent Number: 5,699,729
[45] Date of Patent: *Dec. 23, 1997

[54] ROLL HAVING MEANS FOR DETERMINING PRESSURE DISTRIBUTION

[75] Inventor: Charles Moschel, Stephens City, Va.

[73] Assignee: Stowe Woodward Company, Middletown, Va.

[*] Notice: The term of this patent shall not extend beyond the expiration date of Pat. No. 5,592,875.

[21] Appl. No.: 723,523

[22] Filed: Sep. 30, 1996

Related U.S. Application Data

[63] Continuation of Ser. No. 308,080, Sep. 16, 1994, Pat. No. 5,592,875.

[51] Int. Cl.⁶ .................................................. B30B 3/04
[52] U.S. Cl. ............................ 100/99; 72/10.4; 72/14.4; 73/862.55; 73/862.68; 100/153; 100/176; 492/10; 492/20
[58] Field of Search .......................... 100/47, 99, 153, 100/176; 72/10.4–10.6, 14.4, 14.5, 31.07–31.09; 73/862.55, 862.68; 425/149, 169, 367, 368; 492/9, 10, 20

[56] References Cited

U.S. PATENT DOCUMENTS

| | | | |
|---|---|---|---|
| 3,962,911 | 6/1976 | Grenlund | 73/862.55 |
| 4,016,756 | 4/1977 | Kunkle | 73/862.55 |
| 4,233,011 | 11/1980 | Bolender et al. | 425/143 |
| 4,464,921 | 8/1984 | Surat | 72/10.6 |
| 4,509,237 | 4/1985 | Volz et al. | 100/162 B |
| 4,729,153 | 3/1988 | Pav et al. | 100/170 |
| 4,898,012 | 2/1990 | Jones et al. | 72/11 |
| 4,910,985 | 3/1990 | Ballyns | 72/10.4 |
| 4,938,045 | 7/1990 | Rosenstock et al. | 72/14.4 |
| 5,048,353 | 9/1991 | Justus | 73/862.55 |
| 5,379,652 | 1/1995 | Allonen | 73/862.55 |
| 5,383,371 | 1/1995 | Laitinen | 73/862.55 |

*Primary Examiner*—Stephen F. Gerrity
*Attorney, Agent, or Firm*—Myers Bigel Sibley & Sajovec, L.L.P.

[57] ABSTRACT

A roll system for use particularly in a papermaking press nip for dewatering a fibrous web, comprising a roll disposed so as to rotatingly cooperate with another roll in a press nip, the roll having a helical sensor for sensing pressure exhibited on the roll, and transmitting pressure signals to a processor as the roll rotates. Trigger signals are generated at certain times as the roll rotates, the time of the occurrence of the trigger signal representing a specific location on the helical sensor. The pressure signals are coordinated with the trigger signals, such that the pressure corresponds to the angular position of the roll where it is sensed. The operator may thus be given a visual or audible indication of the existence of non-uniformities in pressure sensed at various locations along the roll, thereby enabling corrective action to be initiated if necessary.

15 Claims, 4 Drawing Sheets

ROLL HAVING MEANS FOR DETERMINING PRESSURE DISTRIBUTION

This is a continuation of application Ser. No. 08/308,080 filed on Sep. 16, 1994 now U.S. Pat. No. 5,592,875.

FIELD OF THE INVENTION

This invention relates to a roll for use in a nip roll press, which is capable of detecting variations in pressure along the length of the roll.

BACKGROUND OF THE INVENTION

The present invention relates to rolls for use particularly in nipped roll presses, in which rolls exert pressing forces on webs for forming paper, textile material, plastic foil and other related materials. Although the present invention may be used in the above industries, the discussion to follow will focus on the function of rolls particularly in the manufacture of paper.

The first stage of a papermaking process requires deposition of headbox stock on a forming fabric. As the stock is deposited, a great deal of the white water therein flows through the interstiches of the fabric. That which is left thereon, a combination of water and fibers, travels on the fabric and goes through one or more dewatering stages so that a resulting fibrous web or matt is left thereon. One, such dewatering stage is effected by passing the web through rolls forming a nip press or series thereof, during which process water is expelled from the web. A problem common to such rolls forming the nip press, is the lack of uniformity in the pressure distributed therealong. Such lack of uniformity often results in paper of poor quality.

Conventional rolls for use in a press section may be formed of one or more layers of material. Roll deflection, commonly due to sag or nip loading, has been a problem in the industry. Rolls have been developed which monitor and alter the crown to compensate for deflection. These rolls have a floating shell which surrounds a stationary core. Underneath the floating shell are pressure regulators which detect pressure differentials and compensate therefor.

One such roll is described in U.S. Pat. No. 4,509,237. This roll has position sensors to determine an uneven disposition of the roll shell. The signals from the sensors activate support or pressure elements underneath the roll shell, to equalize any uneven positioning that may exist due to pressure variations. The pressure elements comprise conventional hydrostatic support bearings which are supplied by a pressurized oil infeed line. A similar roll is disclosed in U.S. Pat. No. 4,729,153. This controlled deflection roll further has sensors for regulating roll surface temperature in a narrow band across the roll face. Other controlled deflection rolls such as the one described in U.S. Pat. No. 4,233,011, rely on the thermal expansion properties of the roll material, to achieve proper roll flexure. Such deflection compensated rolls are effective in varying the crown. Thus, such rolls can operate as effectively at a loading of 100 pounds per inch as at 500 pounds per inch, whereas rolls without such capabilities can only operate correctly at a single specific loading.

However, a problem inherent to both controlled deflection rolls and plain rolls is that there is no way to measure the loading across the roll face while the roll is in operation. If roll loading in a controlled deflection roll is set to 200 pounds/inch, it may actually be 300 pounds/inch at the edges and 100 pounds/inch in the center.

Conventional methods of determining the presence of such discrepancies in applied pressure require stopping the roll and placing a long piece of carbon paper or pressure sensitive film in the nip. This procedure is known as taking a nip impression. This procedure, although useful, cannot be used while the nip press is in operation. Moreover, temperature and other related changes which would affect the uniformity of nip pressure, cannot be taken into account.

The roll described in U.S. Pat. No. 4,898,012 has attempted to address this problem by incorporating sensors on the roll to determine the pressure profile of a press nip. However, there are a number of problems inherent to this roll. Primarily, the construction requires a stationary center beam, and as such Would not be adapted to all types of rolls, but only controlled deflection rolls having a floating roll shell. Additionally, the sensors are discrete sensors which yield only a small number of readings. Furthermore, each sensor must be connected separately, leading to wiring and connection problems. Additionally, the spaced locations of the sensors may lead to inaccuracies as they may fail to detect a portion of the material where an uneven profile exists. Furthermore, the system requires the positioning of two nips 180° apart, so as to guarantee the ability to sense an out-of-round condition. The positioning of nips in such a manner is customary in steel mills or plate rolling, but is seldom so positioned in a papermaking process.

SUMMARY OF THE INVENTION

Therefore, it is a primary object of the invention to enable the operator to easily and accurately detect uneven pressure distribution exhibited by a roll in a nip press.

It is another object of the invention to indicate the location along the roll in the nip press, at which pressure is being sensed.

It is a further object of the invention to inform the operator of pressure variations at specific locations on the roll in a nip press.

It is yet another object of the invention to facilitate the adaptability of pressure detection to all types of rolls, including, but not limited to, controlled deflection rolls, solid rolls, and hollow rolls.

It is still another object of the invention to provide the operator with immediate knowledge of improper roll or machine functioning.

In order to implement these and still further objects of the invention, which will become more readily apparent as the description proceeds, the arrangement of the present invention is manifested by a roll for use particularly in a papermaking press nip for dewatering a fibrous web, having means for sensing pressure therealong, the means for sensing taking the form of a helical sensor adapted to transmit pressure signals to a conditioning unit as the roll rotates in cooperation with another roll in a nip press. The pressure signals are then coordinated in a processing unit with a trigger signal. The trigger signal occurs at set intervals, thus representing the position of the roll as it undergoes a revolution. The signals emanating from the sensor are then coordinated with respect to signals from said means for triggering, and subsequently displayed to provide the operator with a visual and/or audible indication of the pressure exhibited by the roll at various locations therealong.

DETAILED DESCRIPTION OF THE DRAWING

Figure 1:
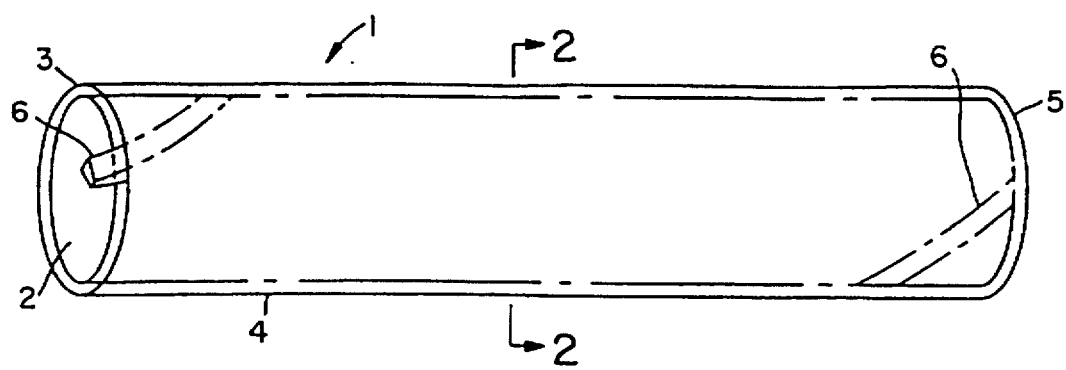
FIG. 1 is a plan view of the roll of the present invention.

As shown in FIG. 1, the roll 1 construction of the instant invention preferably comprises an inner base roll 2 and an outer roll cover 4. The inner base roll 2 and the outer roll cover 4 may comprise any material suitable for use in making a press roll. The inner base roll 2 may comprise one or more lower layers, with the outer roll cover 4 being the top layer. Surrounding the inner base roll 2 is a helical sensor 6 which preferably comprises a piezoelectric film. Other permissible sensor material may include an optical fiber through which light is pulsed. The invention is not to be limited to the above-named sensors and may include other pressure sensors known to those of ordinary skill in the art.

The helical pressure sensor 6 preferably runs along the inner base roll 2 from a first end 3 of the roll 1 to a second end 5. Only one helix is created so that every portion of the sensor represents a different angular location on the roll. Other constructions of the instant invention may include multiple sensors, each forming one helix, adjacently disposed on the roll 1 (not shown).

Figure 2:
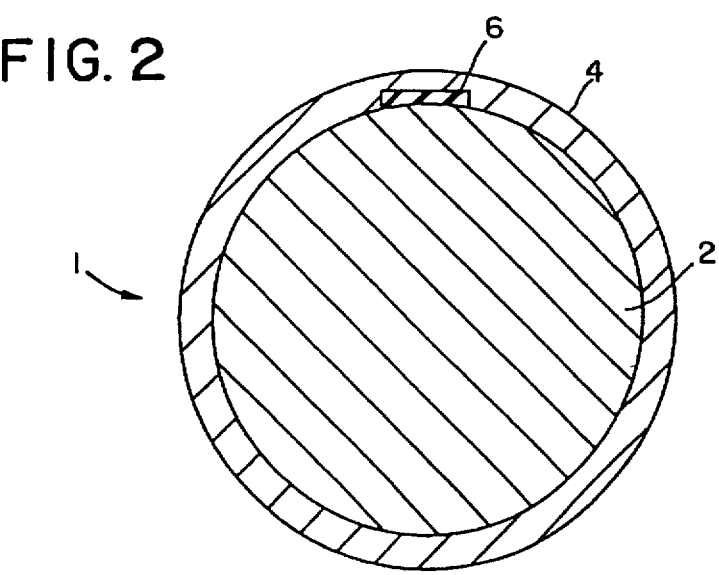
FIG. 2 is a cross-sectional view of the roll of the present invention.
Figure 3:
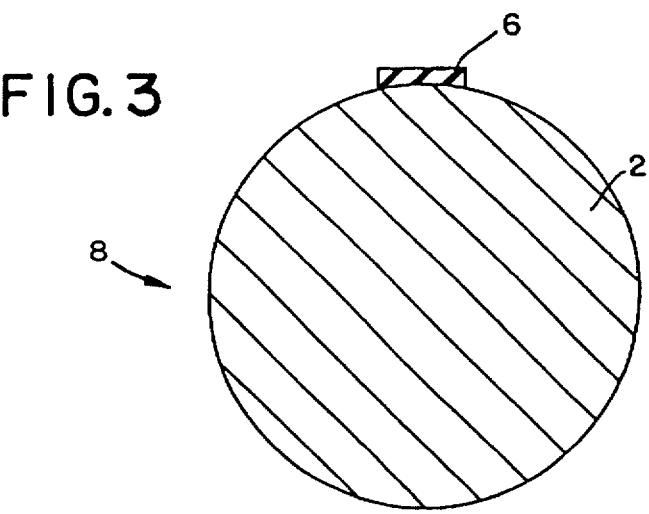
FIG. 3 is a cross-sectional view of an alternative roll construction of the present invention.

FIG. 2 shows a cross section of the roll of FIG. 1 along lines 2—2. As shown in this figure, the helical sensor 6 winds around the inner base roll 2 so as to sense the pressure exerted thereon. It is envisioned that the helical sensor 6 may be placed between any two layers of a multi-layered roll. Alternatively, the cross section as shown in FIG. 3 demonstrates a roll construction comprising a single core roll 8 having a helical sensor 6 lying on the top surface of the roll 8.

Figure 4:
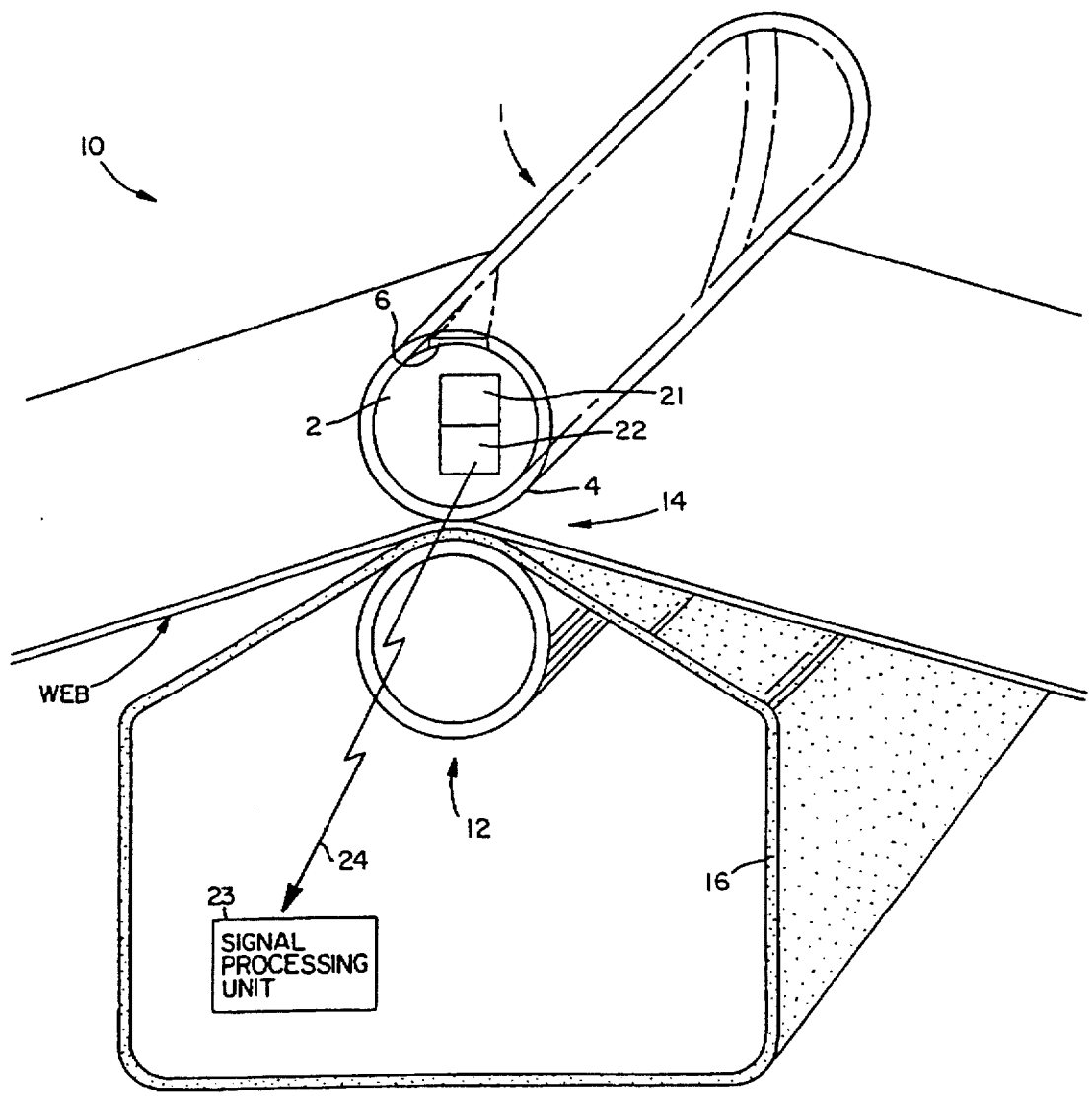
FIG. 4 is a plan view of the roll of FIG. 1 used in a nip press configuration.

FIG. 4 shows a nip press 10 employing the roll 1 of the present invention. As shown in this figure, two rolls 1 and 12 are disposed in a cooperating relationship, forming a nip press 10. One or both of the rolls 1, 12 may have a helical sensor thereon. For purposes of illustration, this discussion will focus on only one of the rolls as having sensing capabilities.

In operation, a web is transported through the nip 14 by resting on the paper machine fabric 16 which surrounds the roll 12. As the web travels through the nip 14, the helical sensor 6 detects the variations in pressure existing against the outer roll cover 2. Due to the helical configuration of the sensor 6, the web contacts a different portion of the sensor 6 as the roll 1 rotates. The sensor 6 is electrically coupled to a signal conditioning unit 21 which transmits conditioned signals representing the pressure to the processing unit 23. The link between the signal conditioning unit 21 and the signal processing unit 23, is preferably a wireless transmitter 22, however it can be direct-wired. Wireless transmission is carried out via radio waves, optical waves, or other known remote transmission methods. If a direct wired transmission is desired, a slip ring assembly or a rotary transformer (not shown) can be used, as the roll 1 would be moving and the signal processing unit 23 would be stationary.

Figure 5:
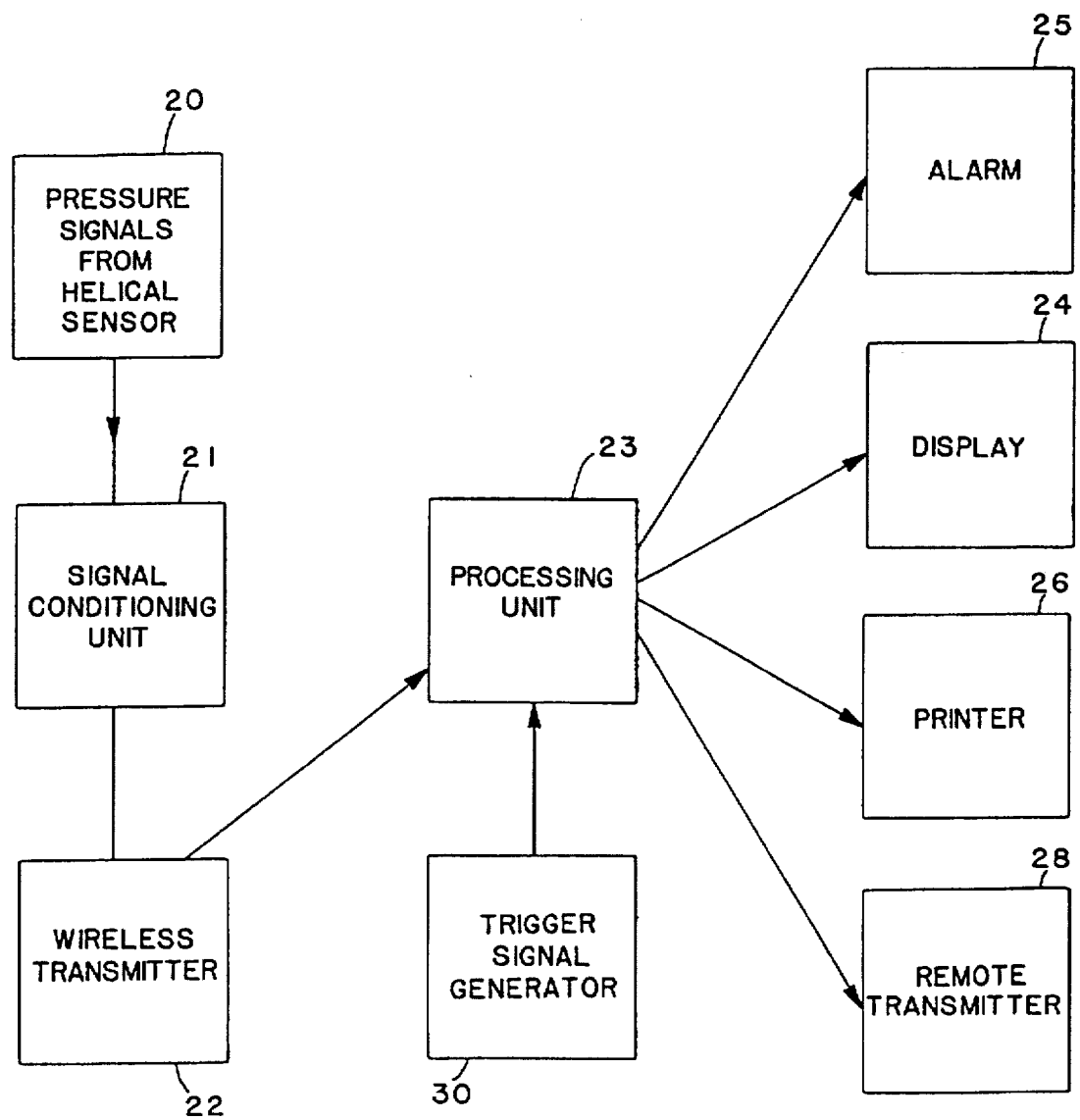
FIG. 5 is a block diagram depicting the system of the instant invention.

FIG. 5 show a block diagram of the roll system of the instant invention. As discussed above, pressure signals 20 from the helical sensor 6 provide an indication of the pressure being sensed as a web travels on the fabric through the nip press 10. As stated above, the pressure signals 20 are sent to a signal conditioning unit 21. The conditioned pressure signals are later sent to the processing unit 23 via wireless transmitter 22, where they are synchronized with a trigger signal from the trigger signal generator 30.

At any point in time, the sensor 6 will be under a specific cross machine location. In order to locate this specifically the trigger signal, which may take the form of an electrical or optical signal, is synchronized with the conditioned pressure signal. The trigger signal is essentially a clock pulse, occuring when a specific angular location on the roll 1 makes a complete revolution, thus indicating a specific cross machine position of the sensor 6 in the nip 14.

Figure 6:
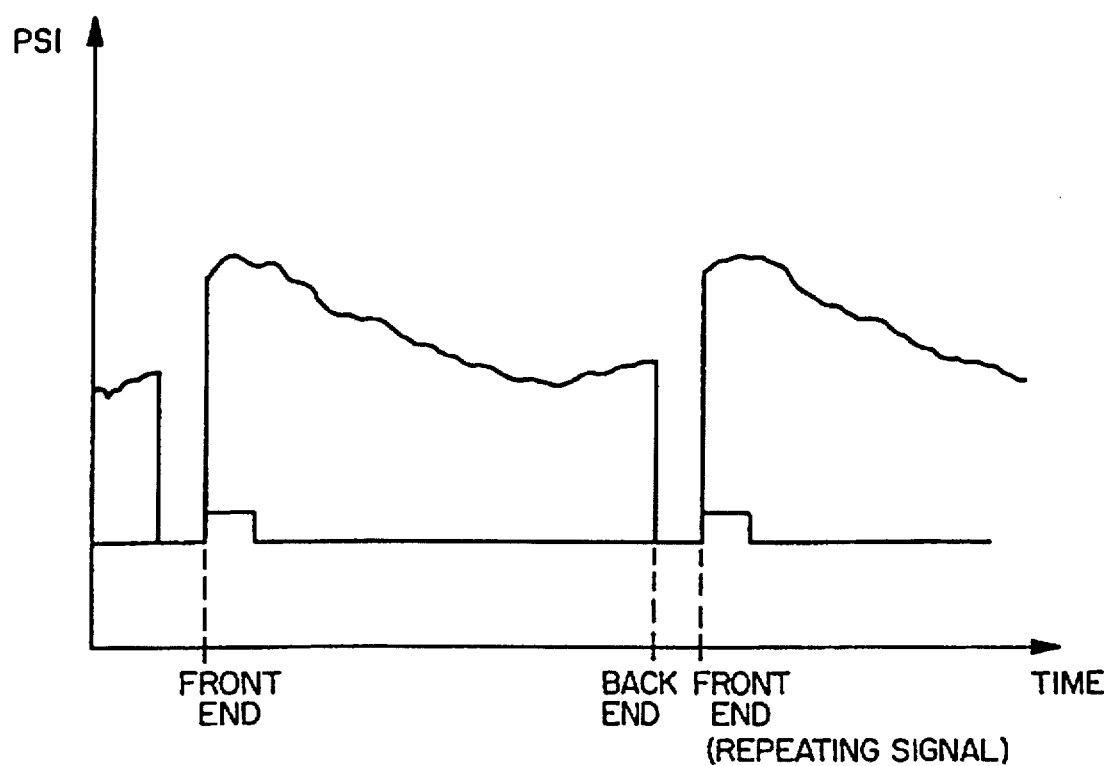
FIG. 6 demonstrates the coordination of a pressure signal with the trigger signal.
Figure 7:
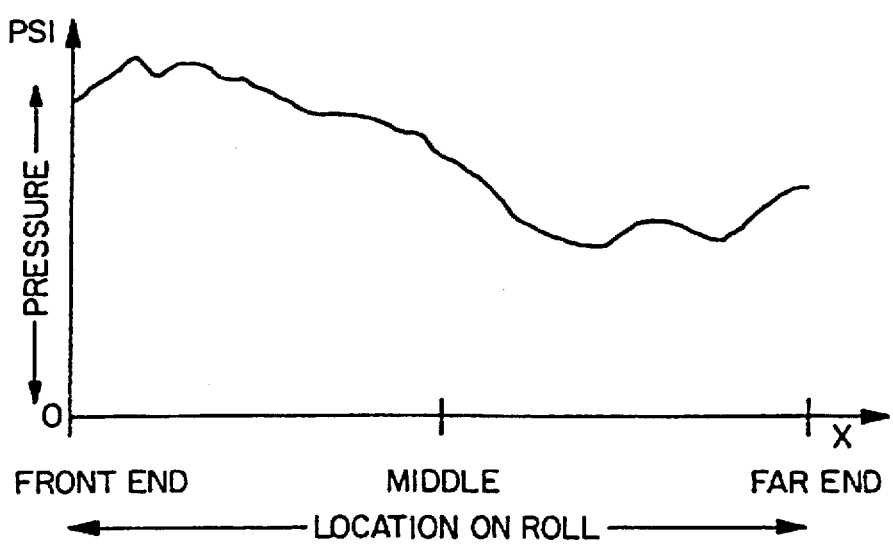
FIG. 7 shows a graphical display of the pressure sensed by the roll.

FIG. 6 shows the coordination between conditioned pressure signals 21 and the trigger signals. The pressure signal between the first and the second trigger signal represents the pressure exerted on the roll 1, and thus the sensor 6, from the first end 3 to the second end 5, as it undergoes rotation. The placement of the sensor 6 in a helical configuration on the roll i results in a continually changing location of the sensor 6 further down the roll 1. Thus, the trigger signal is actuated every time a designated point on the sensor 6 makes a complete revolution. Thus, the pressure sensed at a certain location on the roll will again be sensed at that location after the roll has made a complete revolution. For instance, if the designated point is a portion of the sensor 6 at the first end 3 of the roll 1, the trigger signal will be actuated every time that portion of the roll 1 returns to its original location after making a complete revolution. By using such a trigger signal, the pressure signal representing the pressure sensed along the roll 1, is thereby coordinated with the location on the roll i where sensed. The pressure curve shown in FIG. 6 illustrates a more heavily loaded section near the front of the roll.

The pressure signal may be further sent to peripheral devices as shown in FIG. 5, such as an audible alarm 25, a printer 26 or a remote transmitter 28, all of which may provide the operator with an indication of pressure variations along the roll 1. An audible alarm 25 may be used to immediately alert the operator of the existence of a serious condition. A printer 26 providing the operator with a hard copy of the pressure reading may be useful in diagnostic applications. A remote transmitter 28 may be useful in operations where an operator or a central control room is located away from the actual site of the papermaking machine. A remote operator is thus easily able to view such pressure variations without being present at the site.

Should the display 24 indicate to the operator that the pressure being sensed is much greater at one location on the roll 1 than at another, the system may be stopped and the operator can correct the problem. Alternatively, this invention may be envisioned to have a control system connected thereto, which, in response to a high or low pressure signal, automatically alerts the operator and then initiates corrective procedures.

The screen display 24 as shown in FIG. 5 graphically shows the pressure signal in terms of location on the roll. The y axis designates pressure in pounds per square inch, while the x axis designates location in terms of the length of a roll. Thus the pressure signal is configured with respect to the trigger signal, such that a certain x value on the display represents a location on the roll 1 where the pressure is being sensed. The trigger signal thus controls the display such that the pressure signal appears initially at the left of the display, corresponding to the point at which the sensor 6 first appears (see FIG. 1), that being at the front end 3 of the roll 1. The pressure signals lying at the right side of the screen, are those that are sensed during the time interval (shown in FIG. 6) which occurs after the initial trigger but before the second trigger. This corresponds to pressure sensed at locations from a mid portion of the roll 1 to the end 5 of the roll 1. This graphical representation repeats with the rotation of the roll 1.

While the invention has been particularly shown and described with reference to the aforementioned embodiments, it will be understood by those skilled in the art that various changes in form and detail may be made therein without departing from the spirit and scope of the invention. Thus, any modification of the shape, configuration and composition of the elements comprising the invention is within the scope of the present invention.

I hereby claim:

1. A system for sensing pressure in a press nip comprising:

a first roll configured with a second roll in a press nip, said first roll and said second roll adapted to rotatingly press matter therebetween, said first roll comprising at least one optical sensor disposed in a continuous helical configuration around said first roll for sensing pressure exhibited on said first roll and for providing a pressure signal representative thereof;

a processing unit for processing said pressure signal; and a peripheral device for providing an indication of pressure distribution, coupled to said processing unit, wherein said peripheral device signals non-uniform pressure distributions thus evidencing an operating malfunction.

2. The system for sensing pressure in a press nip according to claim 1, said first roll further comprising a multi-layered member.

3. The system for sensing pressure in a press nip according to claim 2, wherein said optical sensor is disposed in between layers of said multi-layered member.

4. The system for sensing pressure in a press nip according to claim 1, said first roll further comprising a solid member.

5. The system for sensing pressure in a press nip according to claim 1, wherein said optical sensor is disposed on an outer surface of the roll.

6. A sensing roll for use in a press nip comprising:

a cylindrical member adapted for rotatingly pressing against another member;

at least one pressure sensor disposed in a helical configuration along an entire length of said cylindrical member for generating a pressure signal; and a processing unit for processing said pressure signal to generate an audible output signal representing a distribution of pressure at specific locations along the cylindrical member.

7. The sensing roll according to claim 6, said cylindrical member further comprising a multi-layered member.

8. The sensing roll according to claim 7, wherein said optical sensor is disposed in between layers of said multi-layered member.

9. The sensing roll according to claim 6, said cylindrical member further comprising a solid member.

10. The sensing roll according to claim 6, wherein said optical sensor is disposed on an outer surface of the cylindrical member.

11. A sensing roll for use in a press nip comprising:

a first cylindrical member for rotatingly pressing against a second cylindrical member;

at least one pressure sensor disposed in helical configuration along an entire length of said first cylindrical member for generating a pressure signal; and a processing unit for processing said pressure signal to generate an audible output signal representing a distribution of pressure at specific locations along said first cylindrical member.

12. The sensing roll according to claim 11, said first cylindrical member further comprising a multi-layered member.

13. The sensing roll according to claim 12, wherein said optical sensor is disposed in between layers of said multi-layered member.

14. The sensing roll according to claim 11, said first cylindrical member further comprising a solid member.

15. The sensing roll according to claim 11, wherein said optical sensor is disposed on an outer surface of the first cylindrical member.

* * * * *

UNITED STATES PATENT AND TRADEMARK OFFICE
Certificate

Patent No. 5,699,729            Patented: December 23, 1997

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Charles Moschel and Robert H. Moore.

Signed and Sealed this Fifteenth Day of December, 1998.

JOHN SIPOS
*Supervisory Patent Examiner*
Technology Center 3700, Art Unit 3728